United States Patent [19]

Dubost et al.

[11] 4,131,404
[45] Dec. 26, 1978

[54] DEVICE FOR THE PROTECTIVE COVERING OF OPTICAL FIBRES

[75] Inventors: René Dubost, La Tour du Pin; Francis Gauthier, Oullins; Georges Mignien, Meyzieu, all of France

[73] Assignee: Societe Anonyme Dite: Les Cables de Lyon, Lyons, France

[21] Appl. No.: 817,528

[22] Filed: Jul. 19, 1977

[30] Foreign Application Priority Data

Jul. 29, 1976 [FR] France ................................. 7623179

[51] Int. Cl.² ............................................. B29F 1/10
[52] U.S. Cl. .................................. 425/129 R; 264/271
[58] Field of Search .................... 425/13, 129 R, 120, 425/123, 108, DIG. 130, 573, 547; 264/271, 1, 262, 263; 156/158; 65/4 B

[56] References Cited

U.S. PATENT DOCUMENTS

| 2,497,757 | 2/1950 | Bonnett .......................... 425/129 X |
| 3,871,935 | 3/1975 | Gloge et al. ...................... 264/271 X |

FOREIGN PATENT DOCUMENTS

| 1951944 | 4/1971 | Fed. Rep. of Germany ........... 249/105 |
| 608992 | 9/1948 | United Kingdom ..................... 264/271 |

*Primary Examiner*—William R. Briggs
*Attorney, Agent, or Firm*—Haseltine, Lake, & Waters

[57] ABSTRACT

A covering of thermoplastic material applied to a bare portion of optical fibre by pressure molding.

The device for performing the pressure molding includes a micro injection cylinder and a mold having a distribution chamber with injection holes distributed over the fibre to be covered.

3 Claims, 2 Drawing Figures

DEVICE FOR THE PROTECTIVE COVERING OF OPTICAL FIBRES

The invention relates to a method and a device for the protective covering of optical fibres and which, in particular, recreates the geometrical and mechanical characteristics of their original covering, said fibres having been joined by butt-welding.

According to a previous method, the ends of the fibres were butt-welded, and the joints were then held by various methods in rigid supports.

The method was difficult to apply, did not afford protection easily, and involved delicate operations. Further, the joint obtained was bulky, and did not permit bundling of fibres so joined.

Preferred embodiments of the invention are free of these disadvantages, and the protection obtained is excellent. They also permit the bundling of the joined fibres, since their O.D.'s remain the same in the joint area as elsewhere, and the degree of additional optical signal attenuation due to the joint so produced is slight.

The present invention provides a device for producing a protective covering on an optical fibre of a few to a few hundred microns in diameter, for the purpose of covering a bare length of fibre between two covered lengths, and comprising a press, an injection cylinder, and a mold, said mold closing around the bare length and being composed of three separable parts; the first, termed "upper," delimiting a distributed-feed chamber on its side facing the fibre and having a cup on its side facing the cylinder, with at least one hole leading from the cup into the chamber; the second, termed "intermediary," being a plate with a half-round groove on its side facing the fibre and a number of feed holes in two staggered rows along said groove, one on either side of the vertical plane passing through the center-line of the fibre and normal to the horizontal plane passing through the center-line, and the third, termed "lower" with a groove complementary to that already mentioned, in forming a cylindrical mold print of the dimensions and geometry of the covering to be formed.

The present invention also provides a method of forming a protective covering around optical fibres of a few to a few hundred microns in diameter, the method comprising pressure molding a sleeve around bare fibre.

An embodiment of the invention is described below by way of example, with reference to the accompanying drawing in which.

Figure 1:
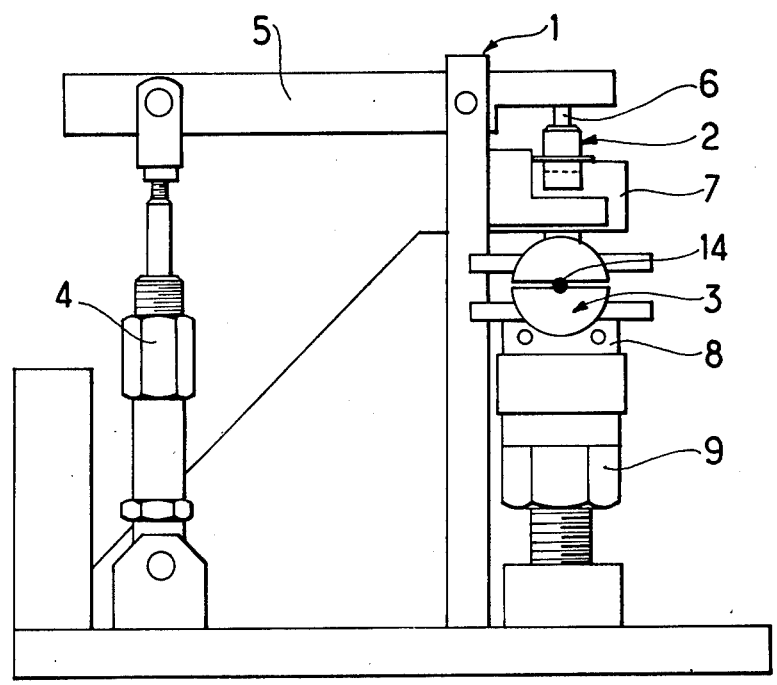
FIG. 1 is a schematic diagram of the device embodying the invention.

An injection molding recoverer is formed of three subassemblies: a miniature vertical press 1, an injection system 2, and a mold 3 (FIG. 1).

The miniature press 1 comprises: air-jack 4 and beam 5, the latter transmitting air-pressure to piston 6 in cylinder 2; two thermostated heaters 7 and 8 to bring the injection cylinder 2 and mold 3 to desired temperatures, the latter being cooled at both ends by a flow of fluid; and screw-jack 9 to position mold 3 and cylinder 2.

Figure 2:
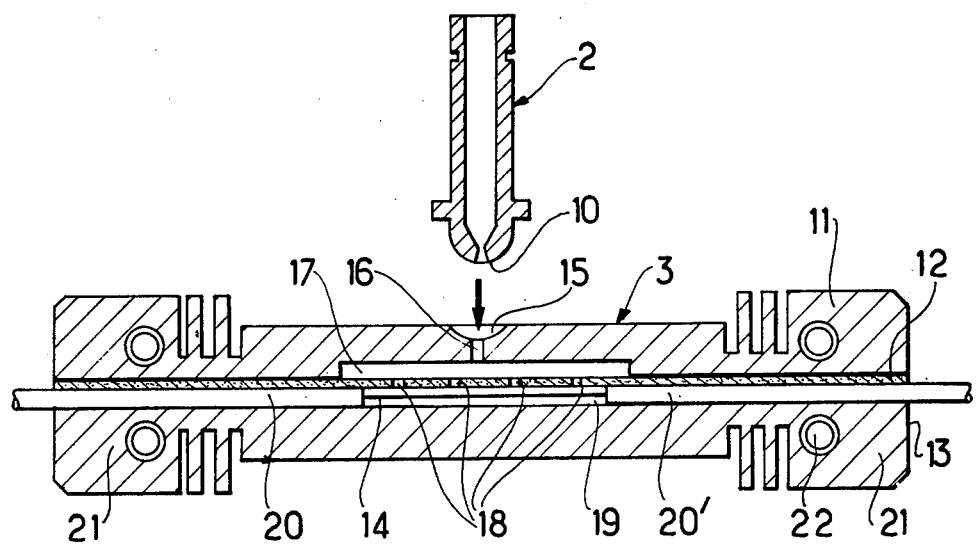
FIG. 2 is a detailed schematic cross-section of an injection cylinder and mold.

Details of cylinder 2 are shown in FIG. 2. The cylinder is used to receive rods of covering material for injection into mold 3. It has a capacity greater than the volume of material necessary for the re-creation of a typical length of cladding, so as to ensure complete filling of the intermediary distributed-feed chamber. Its hemispherical nose 10 provides easy, fast mating with the mold 3 by simple application of pressure, while ensuring air-tightness to avoid oxidation of the material.

A vertical cross-section of mold 3 is shown in FIG. 2: the upper part 11, intermediary part 12, and lower part 13, in which the optical fibre to be covered is positioned.

The round nose of cylinder 2 enters the cup 15 in part 11. The covering material is injected through hole 16 into distributed-feed chamber 17, closed by part 12. Part 12 is a plate with through-holes 18, through which the material is injection fed into the cylindrical mold print 19 formed by the tight juxtaposition of the two half-round grooves machined in parts 12 and 13. Holes 18 are arranged in a staggered array of two rows, one on either side of the plane passing through the center-line of the fibre and normal to the horizontal plane passing through that center-line, thereby avoiding the shifting of fibre 14 and the application of stresses to the still fragile fibre joint, when the covering material is injected.

The diameter of the mold print 19 is of the dimensions of the covering to be re-formed, and it is normally closed at each end by the covering 20 and 20' existing on the fibres joined.

The ends 21 of mold 3 are cooled by a flow of coolant through ducts such as 22. These ends 21 clamp coverings 20 and 20', which by the molding process described are joined by an unbroken sleeve over the joint.

Operation of the device is as follows: a determined length at the end of each fibre is bared, and the two bared tips are fused together. The fibre at the joint must now be protected and strengthened by covering but of the same diameter as formerly. For this, material is injected around it, that is of the same or similar characteristics as the original covering. The joint and bared length, plus a short covered length at each end of the bared length, are positioned in the mold and held by bringing parts 12 and 13, and then 11, together. The closed mold 3 is then placed on heater 18.

A rod of covering material sufficient for the reconstitution of the covering is put into injection cylinder 2, and the cylinder-mold assembly is formed by gentle pressure by means of screw-jack 9.

The conditions of the working cycle having been determined (cylinder and mold temperatures, injection pressure, heating time, cooling time) the cycle starts with raising the temperature of cylinder 2 by means of heater 7. This temperature being stabilised, the required mold temperature is obtained with heater 8, and its two ends maintained cool.

On stabilisation of mold temperature, the covering material is injected by means of air-jack 4.

Heating of the injection cylinder and mold are cut-off immediately after injection, and the mold is opened once it has cooled to about 50° C. Separating its parts makes removal of the covered optical fibre easy, and the geometry of the cylinder-mold interfacing parts facilitates removal of the sprues and cleaning of the cup 15 and feed holes 18.

The device invented restores the covering of moldable material of optical fibres by forming a sleeve of the same diameter as the original covering. Its applications pertain to fibre optics for telecommunications.

We claim:

1. An apparatus for forming a protective covering on an optical fibre, by butt welding the ends of two fibres for the purpose of covering a base length of fibre on either side of the butt weld between two covered lengths of fibre, and comprising: a press employing means for transmitting air pressure through a piston in an injection cylinder in working relation thereto, said injection cylinder having means to feed raw moldable material into a mold in alignment therewith, means to close said mold around the base length of said fibre, said mold being defined by three separable parts; a first part for delimiting a distributed-feed chamber on its downward side, facing the fibre and having a cup on its upward side facing the cylinder, with at least one passageway leading from the cup into the chamber; a second part, being a plate with a half-round groove on its downward side facing the fibre and having a plurality of feed holes in two staggered rows along said groove, each row of said holes on either side of a vertical plane passing through the center line of said half-round groove and normal to the horizontal plane passing through said center-line; said passageway being positioned on said center-line, and a third part, with a half-round groove on its upward side complementary to the groove of said second part, to form a cylindrical mold print of the dimensions and geometry of the covering to be formed, said second and third parts having receiving means to position said covered lengths of fibre.

2. An apparatus according to claim 1, wherein: the cup between the injection cylinder and mold assembly is in the form of a hollow hemisphere, being adapted to provide rapid and air-tight mating of said cylinder and mold for injection of the covering material.

3. An apparatus according to claim 1 wherein: said second and third parts are provided with coolant ducts at each of their ends.

* * * * *